United States Patent

Byrd

[11] Patent Number: 5,808,195
[45] Date of Patent: Sep. 15, 1998

[54] ARRANGEMENT FOR DETERMINING LIQUID VELOCITY VERSUS DEPTH UTILIZING HISTORICAL DATA

[75] Inventor: John William Byrd, Huntsville, Ala.

[73] Assignee: ADS Environmental Services, Huntsville, Ala.

[21] Appl. No.: 861,416

[22] Filed: May 21, 1997

[51] Int. Cl.$^6$ .................................................. G01F 1/52
[52] U.S. Cl. ........................ 73/215; 73/861.25; 364/510
[58] Field of Search ........................ 73/861.25, 861.23, 73/215, 1.16, 1.34; 364/510, 571.04, 571.05, 571.07

[56] References Cited

U.S. PATENT DOCUMENTS

| | | |
|---|---|---|
| 4,790,323 | 12/1988 | Leavitt et al. . |
| 4,934,373 | 6/1990 | Angelsen et al. . |
| 4,993,418 | 2/1991 | Weaver et al. . |
| 5,016,641 | 5/1991 | Schwartz . |
| 5,020,374 | 6/1991 | Petroff et al. ........................ 73/861.25 |
| 5,065,764 | 11/1991 | Nakamura et al. . |
| 5,198,989 | 3/1993 | Petroff ........................ 364/510 |
| 5,226,328 | 7/1993 | Petroff et al. ........................ 73/861.25 |
| 5,271,404 | 12/1993 | Corl et al. . |
| 5,311,781 | 5/1994 | Gates ........................ 73/861.23 |
| 5,333,508 | 8/1994 | Petroff et al. ........................ 73/861.25 |
| 5,371,686 | 12/1994 | Nabity et al. . |
| 5,406,948 | 4/1995 | Skidmore . |
| 5,463,905 | 11/1995 | Baird . |
| 5,557,536 | 9/1996 | Nabity et al. ........................ 364/510 |
| 5,684,250 | 11/1997 | Marsh et al. ........................ 364/510 |

Primary Examiner—Ronald L. Biegel
Attorney, Agent, or Firm—Baker & Botts, L.L.P.

[57] ABSTRACT

In the embodiments described in the specification, an acoustic transducer unit emits acoustic signals into a moving liquid and receives reflected signals to produce Doppler frequency signals and a depth detector simultaneously detects the depth of the liquid. The Doppler frequency signals are processed in a Fast Fourier Transform unit to determine the average velocity of the liquid and a historical velocity versus depth table is prepared. Thereafter, each new velocity value is compared with an expected velocity value for the corresponding depth based on the historical table. The new velocity value is rejected if the variation from the expected value exceeds a selected variation. If accepted, the new velocity value and the expected velocity value from the table are weighted and combined to provide a new value for the table and also for a velocity versus depth profile unit. The velocity versus depth profile is adjusted based on the new velocity value using a least squares fit.

10 Claims, 2 Drawing Sheets

ARRANGEMENT FOR DETERMINING LIQUID VELOCITY VERSUS DEPTH UTILIZING HISTORICAL DATA

BACKGROUND OF THE INVENTION

This invention relates to liquid velocity determination arrangements and, more particularly, to the determination of liquid velocity versus depth utilizing historical data.

Liquid velocity measurement systems for determining the average velocity of liquid flowing through a conduit by detection of the Doppler frequency of acoustic signals reflected by solid particles in the flowing liquid are described for example, in the Petroff et al. U.S. Pat. Nos. 5,226,328 and 5,333,508, the disclosures of which are incorporated herein by reference.

In many instances, it is desirable to provide a velocity versus depth profile for a stream of liquid such as the liquid flowing in a sewer but individual velocity measurements made at various liquid depths for such streams are subject to variations. To eliminate such variations a data smoothing technique commonly used in such cases is based on averaging multiple readings taken over a short period of time. This technique produces problems in battery-powered liquid flow monitors, which are typically arranged to sample the liquid flow rates only every few minutes, since the number of readings required to adequately smooth the data can discharge the batteries rapidly. In addition, the actual conditions at the measurement site may change dramatically between successive data samples so that averaging a series of readings taken over a long time period may cause a lag error in the velocity values generated by averaging.

Furthermore, the use of theoretical flow models, such as the Manning model or the Colebrook-White model or an empirically determined flow model, may result in flow rate curves which are invalid at specific flow rates. Moreover, it may be too expensive to confirm the proper coefficients for those models which would be required to produce accurate flow rate representations in specific cases.

SUMMARY OF THE INVENTION

Accordingly, it is an object of the present invention to provide an arrangement for data smoothing of velocity versus depth profiles which overcomes the disadvantages of the prior art.

A further object of the invention is to provide a data smoothing arrangement for velocity versus depth profiles which does not require frequent readings during a short period of time and which eliminates time lag errors.

An additional object of the invention is to provide a data smoothing technique for velocity versus depth profiles which is independent of the limitations of theoretical flow models such as the Manning model or the Colebrook-White model, or empirically measured flow models.

These and other objects of the invention are attained by recording a series of liquid velocity and corresponding depth readings in a look-up table to establish an historical velocity versus depth profile and comparing each new velocity versus depth reading to an expected value based on the historical profile. If the new reading is significantly different from the expected value it is rejected as being unacceptable and a more reasonable estimate based upon recent data is used. A weighted average is then calculated using the expected value combined with the new reading and recorded and the resulting value is used to update the stored historical profile.

BRIEF DESCRIPTION OF THE DRAWINGS

Further objects and advantages of the invention will be apparent from the reading of the following description in conjunction with the accompanying drawings, in which.

DESCRIPTION OF PREFERRED EMBODIMENTS

Figure 1:
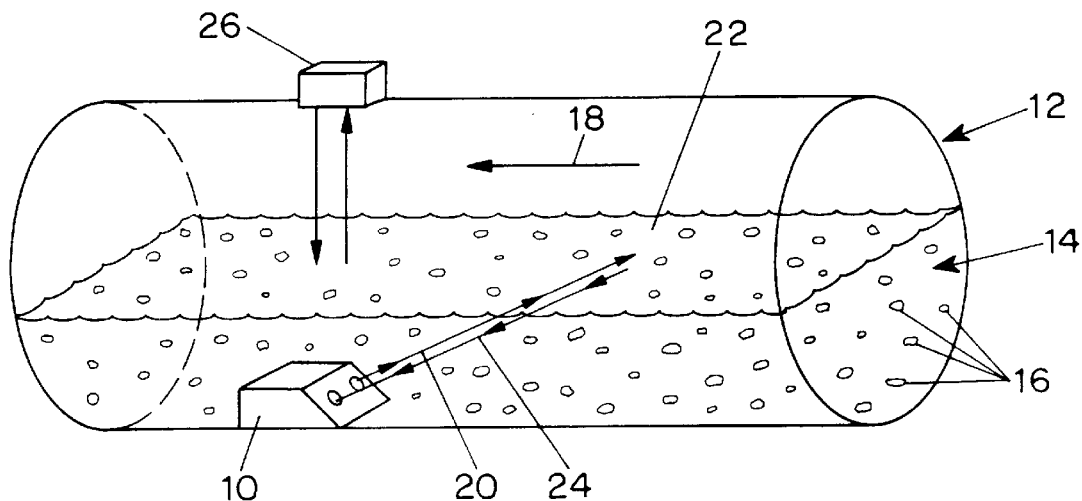
FIG. 1 is a schematic perspective view illustrating a representative arrangement for acoustic detection of flow velocity versus depth for a stream of liquid flowing in a conduit.
Figure 2:
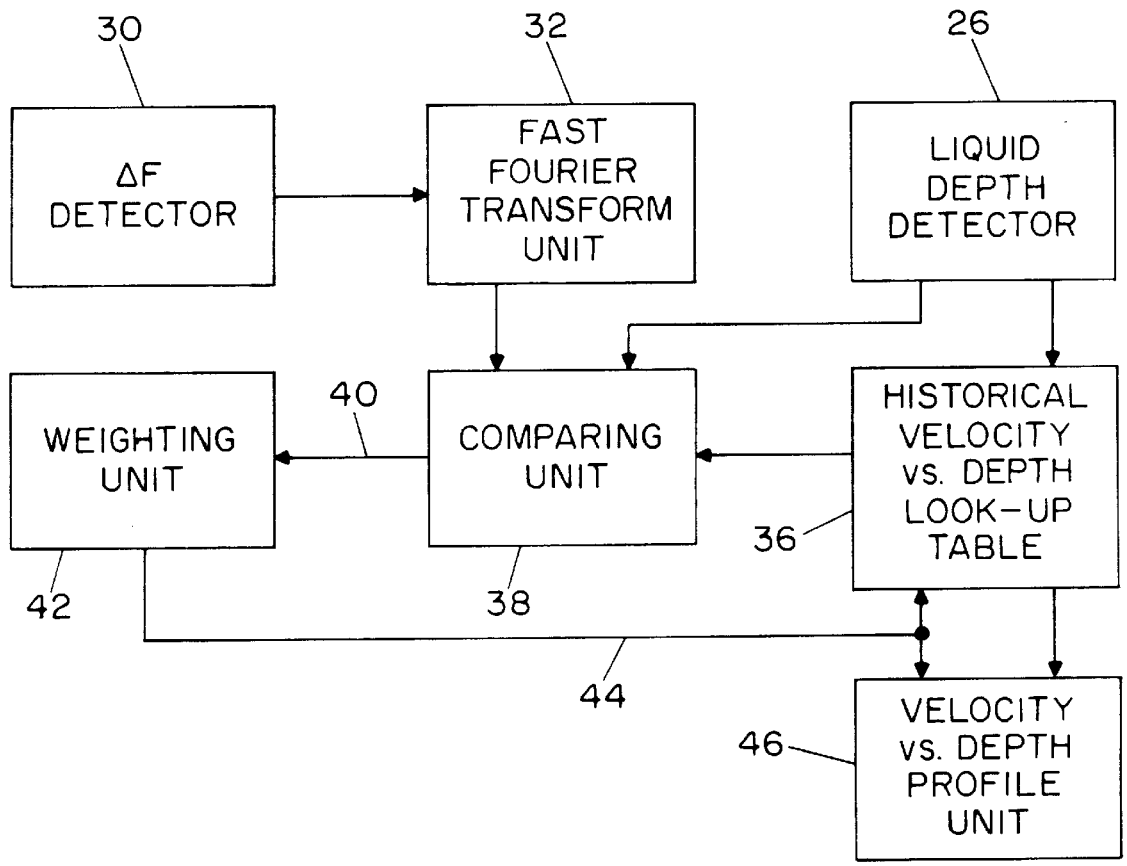
FIG. 2 is a schematic block diagram illustrating a representative arrangement of components for determining a velocity versus depth profile in accordance with the invention.

In the representative embodiment of the invention shown in FIGS. 1 and 2, an acoustic transducer unit 10 is positioned on the bottom of a conduit 12 through which a body of liquid 14 carrying solid particles 16 is flowing in the direction of the arrow 18. The acoustic transducer unit transmits a beam 20 of acoustic signals diagonally upwardly toward the surface 22 of the liquid in the laterally central region of the conduit and receives reflected signals from the particles 16 which move with the liquid surrounding them along a return path 24.

In accordance with the Doppler principle, the frequency of the reflected signals 24 will be higher, assuming the direction of flow indicated by the arrow 18, than the emitted signals by a frequency difference $\Delta F$ which is dependent upon the velocity of motion of the particles from which the signals are reflected. Thus, by generating a spectrum of the amplitudes of the return signals 24 versus the frequency difference between the emitted signal and the return signal i.e., the Doppler frequency, a frequency spectrum can be produced representing the total energy returned by particles moving the liquid at various velocities. From these data the average velocity of the liquid in the stream at the time of the measurement can be determined, for example, in the manner described in U.S. Pat. No. 5,333,508.

In accordance with the invention, the liquid velocity is determined in this manner in a series of measurements in which the liquid in the stream 14 is at different depths and the liquid depth is determined simultaneously by a conventional depth detector 26. Using the velocity vs. depth values thus determined, a velocity versus depth profile 48 for the moving stream of liquid 14 of the type shown in FIG. 3 can be generated.

In the particular embodiment of the invention shown in FIG. 2, a $\Delta F$ detector 30 determines the difference in frequency from the emitted frequency of all of the reflected signals detected by the acoustic signal unit 10 and passes that information to a Fast Fourier Transform unit 34 which generates a series of signals representing the energies of the particles 16 moving at different velocities in the stream of liquid. Those signals are sorted into a series of frequency bins to produce a power spectral curve from which an average velocity value is determined, in accordance with the procedures described in U.S. Pat. Nos. 5,226,328 and 5,333, 508. At the same time, the depth detector 26 detects the depth of the stream of liquid 14 in the conduit 12 in a conventional manner. Each velocity value determined by the Fast Fourier Transform unit and the corresponding liquid depth values are then stored in an historical velocity versus depth look-up table 36.

Thereafter, as each successive velocity measurement is made, the velocity and depth values are supplied to a comparing unit 38 which compares that velocity value with the velocity value in the historical velocity versus depth look-up table 36 for the corresponding depth, using interpolation if necessary. If an unusual event in the flowing liquid results in the generation of an average velocity value at a given depth which is substantially different from the historical velocity at that depth such as, for example, a variation of 30% or more from the historical value, the reading is ignored and a more realistic value, such as an average of the most recent acceptable readings at the adjacent depth levels, is used. If the velocity measurement is within an acceptable range, for example less than 10% different from the expected value, it is used as the new velocity value.

The new velocity value for the selected depth level is then supplied on a line 40 to a weighting unit 42 which applies a weight factor, such as 75%, to the historical velocity value for that depth obtained from the look-up table 36, and another weighting factor such as 25% for the new value obtained on the line 40 from the comparing unit and combines the weighted values into a new historical velocity value for that depth. For convenience, the two weighting factors are selected to add up to 100%, or unity if expressed as fractions. This new velocity value is supplied on the line 44 to both the historical velocity versus depth look-up table 36 and to a velocity versus depth profile unit 46 which generates a velocity versus depth profile 48 of the type shown in FIG. 3 based on the historical data.

In a typical example, liquid flow velocity readings were taken in a 36 inch diameter pipe using the system shown in FIG. 2 at periodic time intervals to determine the flow velocity and liquid depth within the depth range from about five inches to about sixteen inches and the values shown in Table I below were obtained and stored in the historical velocity versus depth look-up table 36:

TABLE I

| Depth (inches) | Velocity (feet per second) |
| --- | --- |
| 5.36 | 1.82 |
| 7.15 | 2.27 |
| 8.94 | 2.87 |
| 10.73 | 3.47 |
| 12.51 | 4.00 |
| 14.30 | 4.61 |
| 16.09 | 5.19 |
| 17.88 | |
| 19.66 | |
| 21.45 | |

Thereafter, a further velocity reading was taken with the liquid level at a depth of 12.75 inches, producing a velocity of 4.17 feet per second. Based on interpolation of the historical profile set forth in Table I, the expected velocity reading at 12.75 inches was 4.08 feet per second. The new reading of 4.17 feet per second, being within 10% of the historical value for that depth, represents an acceptable value and was, therefore, used with a weighted average of historical velocity for that depth.

The weighting factors applied in the weighting unit 42 are preferably tailored to the desired filter response. In this example, the weighting factor chosen for the historical value is 75% (i.e. 0.75) and for the new reading is 25% (i.e. 0.25) which produces a filtered velocity value of 4.10 feet per second (i.e., 4.08×0.75+4.17×0.25). Thus the weighted average of the velocity readings reduced the variation of the new reading from the historical value by 75%. If desired, lower weighting factors such as 50% or 25% may be assigned to the historical profile and higher weighting factors such as 50% or 75% may be assigned to the new velocity value to achieve faster response to sudden hydraulic changes at the site while sacrificing some of the smoothing effect produced by the use of historical weighting.

The final step in the process is to adjust the historical table values and the historical profile based upon the new reading. This is accomplished by calculating the "best fit" curve 48 shown in FIG. 3 using the nearest historical values in the look-up table i.e., 4.00 feet per second at 12.51 inches and 4.61 feet per second at 14.30 inches, and the new velocity reading, 4.17 feet per second at 12.75 inches, and using a least squares fit to adjust the historical table values to 4.04 feet per second at 12.51 inches and 4.62 feet per second at 14.30 inches to produce the new profile values for the look-up table 36 and the profile unit 46. These new values are set forth in Table II below.

TABLE II

| Depth (inches) | Velocity (feet per second) |
| --- | --- |
| 5.36 | 1.82 |
| 7.15 | 2.27 |
| 8.94 | 2.87 |
| 10.73 | 3.47 |
| 12.51 | 4.04 |
| 12.75 | 4.17 |
| 14.30 | 4.62 |
| 16.09 | 5.19 |
| 17.88 | |
| 19.66 | |
| 21.45 | |

Figure 3:
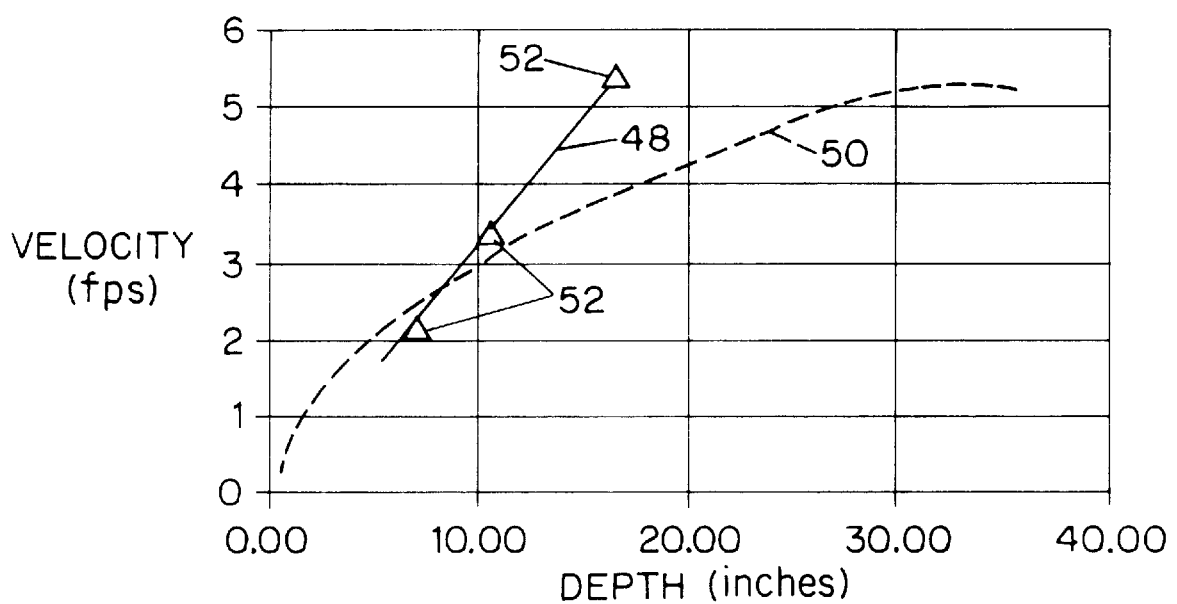
FIG. 3 is a graphical representation showing velocity versus depth profiles based on historical data and on a theoretical curve.

FIG. 3. illustrates the advantages of using an historical profile obtained from depth and velocity data produced at the site during the recent history of the flowing liquid rather than using a theoretical flow curve for site compensation. A theoretical flow calculation called the Manning curve, which is widely accepted for quantification of velocity versus depth at free flow sites, is represented for the 36 inch diameter pipe used in the above example by the dotted line 50 in FIG. 3, and manual measurements of depth and velocity, made at the same time as the measurements of the example using independent measuring devices, are represented by the data points 52 in FIG. 3. These data demonstrate that the historical profile curve 48 properly represents the velocity versus depth relationship in the particular example and that there would be a significant error using the Manning curve to estimate velocity versus depth for depths greater than ten inches.

Although the invention has been described herein with reference to specific embodiments, many modifications and variations therein will readily occur to those skilled in the art. Accordingly, all such variations and modifications are included within the intended scope of the invention.

I claim:

1. A method for determining a velocity versus depth profile for a moving liquid comprising:

determining the velocity and depth of the moving liquid at each of a plurality of liquid depths;

storing the velocity versus depth data obtained by those determinations in an historical look-up table;

determining a further velocity value and determining the depth of the liquid at the time the further velocity value is obtained;

comparing the further velocity value with an expected velocity value for the corresponding liquid depth based upon the historical look-up table to determine whether the further velocity value is within a predetermined range from the expected velocity value;

rejecting the further velocity value if it is outside the predetermined range from the expected velocity value;

if the further reading is within the predetermined range from the expected velocity value, multiplying the further velocity value by a predetermined weighting factor and multiplying the expected velocity value by a further predetermined weighting factor to produce weighted velocity values;

combining the two weighted velocity values to provide a new velocity value; and adjusting one or more velocity values in the historical look-up table, if necessary, in view of the new velocity value to provide a smoothing velocity versus depth profile.

2. A method according to claim 1 wherein the step of adjusting one or more velocity values is accomplished by determining a least squares fit of the velocity versus depth values in the historical table and the new velocity value to a velocity versus depth profile.

3. A method according to claim 1 wherein the velocity values for each depth are obtained by:

directing acoustic signals into the moving liquid;

detecting acoustic signals reflected from solid particles in the moving liquid;

subjecting the reflected signals to a Fast Fourier Transform operation;

simultaneously detecting the depth of the liquid; and determining the average velocity of the moving liquid from the signals produced by the Fast Fourier Transform.

4. A method according to claim 1 wherein a new velocity value is rejected if it differs from an expected velocity value at the same depth by a difference exceeding 10% of the expected velocity value.

5. A method according claim 1 wherein the weighting factors for the new velocity value and for the expected velocity value based on the historical data at the same depth add up to unity.

6. A method according to claim 1 wherein the weighting factor for a new velocity value is greater than the weighting factor for an expected velocity value based upon the historical table in order to achieve fast response of the velocity versus depth profile to changes in the hydraulic conditions in the flowing liquid.

7. A method according to claim 1 wherein the weighting factor for a new velocity reading is less than the weighting factor for the expected velocity at the same depth based on the historical table in order to provide improved smoothing of the profile of velocity versus depth.

8. An arrangement for determining a velocity versus depth profile comprising:

a system for generating data representing velocity versus depth for a moving liquid;

an historical velocity versus depth look-up table for storing velocity versus depth data generated by the system;

a comparing unit for comparing a new velocity value at a selected depth obtained from the system with an expected velocity value based upon recorded historical data at the same depth and for rejecting new velocity data which exceeds a selected variation from the expected velocity; and a weighting unit for weighting the new velocity value and the expected velocity value and summing the weighted values to provide a weighted value for a velocity versus depth profile.

9. An arrangement according to claim 8 including a velocity versus depth profile unit for producing a profile of velocity versus depth of the flowing liquid from the historical velocity versus depth look-up table.

10. An arrangement according to claim 8 including:

an acoustic transducer unit for emitting acoustic signals into the moving liquid and receiving reflected acoustic signals from particles moving with the liquid;

a Doppler difference unit for producing Doppler frequency signals from the emitted and reflected acoustic signals;

a depth detector for simultaneously determining the depth of the liquid; and a Fast Fourier Transform unit for transforming the Doppler frequency signals into a Doppler frequency spectrum and for determining an average velocity of the liquid and supplying a corresponding signal to the comparing unit.

* * * * *